United States Patent [19]

Villa

[11] 3,880,949

[45] Apr. 29, 1975

[54] INHERENTLY MOLD-RELEASABLE MOLD OR CASTING COMPOSITION

[75] Inventor: Jose L. Villa, Heightstown, N.J.

[73] Assignee: Thiokol Chemical Corporation, Bristol, Pa.

[22] Filed: Sept. 10, 1974

[21] Appl. No.: 504,782

Related U.S. Application Data

[62] Division of Ser. No. 356,976, May 3, 1973, Pat. No. 3,838,110.

[52] U.S. Cl. .......... 260/835; 106/38.25; 204/159.18; 260/75 NA; 260/77.5 CR; 260/94.7 HA; 260/830 R; 260/830 S; 260/836; 260/837 R; 260/859 R
[51] Int. Cl. .......................................... C08G 45/14
[58] Field of Search ........ 260/830 R, 835, 836, 837

[56] References Cited
UNITED STATES PATENTS

| | | | |
|---|---|---|---|
| 3,135,726 | 6/1964 | Uraneck | 260/836 |
| 3,145,222 | 2/1969 | Brace | 260/408 |
| 3,341,497 | 9/1967 | Sherman | 260/836 |
| 3,431,235 | 3/1969 | Lubowitz | 260/837 |
| 3,515,772 | 6/1970 | Lubowitz | 260/837 |
| 3,576,903 | 4/1971 | Groff | 260/835 |
| 3,595,944 | 7/1971 | Manning | 260/836 |
| 3,616,193 | 10/1971 | Lubowitz | 260/837 |
| 3,645,989 | 2/1972 | Tandy | 260/80.73 |
| 3,645,990 | 2/1972 | Raynolds | 260/80.75 |
| 3,678,127 | 7/1972 | Schmid | 260/835 |
| 3,725,374 | 4/1973 | Mayes | 260/830 |
| 3,739,041 | 6/1973 | Schmid | 260/835 |

*Primary Examiner*—Paul Lieberman
*Attorney, Agent, or Firm*—Thomas W. Brennan

[57] ABSTRACT

An inherently mold-releasable composition which may be used as either the casting composition or, in its cured state, the mold or as a mold liner is disclosed. No additional mold release agent is necessary when using the composition herein which is prepared from (a) hydroxyl or carboxyl-terminated polymers containing pendant 3-perfluoroalkyl-2-iodopropyl or 2-perfluoroalkyl-1-iodoethyl groups, and (b) polyisocyanates or polyepoxides.

11 Claims, No Drawings

INHERENTLY MOLD-RELEASABLE MOLD OR CASTING COMPOSITION

This is a divisional of application Ser. No. 356,976, filed May 3, 1973, now U.S. Pat. No. 3,838,110.

BACKGROUND OF THE INVENTION

1. Field of the Invention

This invention relates to an inherently mold-releasable composition for use as either a casting composition or, in its cured state, a mold or a mold liner, i.e. no additional mold release agent or parting compound need be used in conjunction with this invention. The invention is a cured or curable polymer prepared from a polyisocyanate or a polyepoxide and a hydroxyl or carboxyl-terminated polymer containing pendant vinyl or allyl groups wherein perfluoroalkyl iodides have been added to said groups to form 2-perfluoroalkyl-1-iodoethyl or 3-perfluoroalkyl-2-iodopropyl groups.

2. Description of the Prior Art

Previous polymers containing perfluoro groups have centered upon adding the perfluoro group to a monomer and then polymerizing the monomer to yield the desired product. Cf. U.S. Pat. Nos. 3,645,989 and 3,645,990. Whereas, in this invention the perfluoroalkyl iodide is added to the pendant vinyl or allyl groups of a hydroxyl or carboxyl-terminated polymer containing said groups.

Also, previous reactions of fluoroalkyl iodides with organic compounds have centered about the addition of polyfluoroalkyl methyl or ethyl iodides, i.e. $R_fCH_2I$ or $R_fCH_2CH_2I$, to low molecular weight aliphatic compounds to yield products wherein the iodide is on a carbon atom separated from the perfluoro group by more than one intervening carbon atom. Examples of these reactions are illustrated in the articles by Henne et al., J. Am. Chem. Soc. 73, 1791 (1951); by Hazeldine, J. Chem. Soc., London, 1199 (1953); as well as in U.S. Pat. Nos. 2,972,638, 3,016,406, and 3,408,411.

Other prior work dealt with reactions of polyfluoroalkyl iodides which would not occur by ultraviolet light initiation. Cf. U.S. Pat. No. 3,145,222. The preparation of the basic perfluoralkyl iodide modified hydroxyl or carboxyl-terminated polymer used in this invention may proceed under ultraviolet light catalysis.

Additionally, U.S. Pat. No. 3,427,366 as well as other patents describe the production of polyurethanes from hydroxy terminated diene polymers, but not with fluorocarbon containing polymers. Coassigned U.S. Pat. No. 3,842,053 issued Oct. 15, 1974 discloses the preparation of perfluoroalkyl iodide modified polymeric resins which are suitable for use herein. Also, previous fluorinated polyurethanes have had the fluorine attached directly to backbone carbon atoms as opposed to having high fluorine content groups attached to pendant groups so as to be closer to the surface of the cured product which is believed to be a major factor in the mold release properties herein.

SUMMARY OF THE INVENTION

This invention provides fluorine-containing polymers which have unusual properties and surface characteristics such as to make the cured polymers inherently mold-releasable. Thus, a mold or mold liner prepared from these polymers requires no additional mold release agent. Alternatively, when these polymers are used as the casting composition, no additional mold release agent is necessary.

It is an object of this invention to prepare polymeric molds, mold liners, and casting compositions which require no additional mold release agent for use as such.

These and other objects will become apparent in the following description and claims.

DESCRIPTION OF THE PREFERRED EMBODIMENTS

The mold, mold liner, or casting composition of this invention is prepared from a polymer which is prepared from (1) a hydroxyl or carboxyl-terminated polymer having pendant vinyl or allyl groups, wherein perfluoroalkyl iodides have been reacted with at least some of the pendant groups and (2) a polyisocyanate or a polyepoxide. It is believed that the unusual mold release properties of the resultant mold, mold liner or casting composition are due to the placement of the perfluoroalkyl iodide groups on the pendant vinyl or allyl groups such that the fluorocarbon chains are effectively predominantly on the surface of the resultant cured polymer.

Accordingly, the polymers which are suitable for use in this invention must have two features: (1) they must have hydroxyl or carboxyl terminals to subsequently react with polyisocyanates or polyepoxides to prepare the prepolymers and (2) they must have pendant vinyl or allyl groups suitable for reaction with the perfluoroalkyl iodides. Polymers having these requirements include but are not limited to hydroxyl or carboxyl-terminated polybutadiene polymers and copolymers, polyethers, polyesters, and polysulfides. With all of these polymers, generally the higher the pendant vinyl or allyl content, the more fluorine which may be attached to the polymer.

The hydroxyl-terminated polybutadiene polymers and copolymers may be prepared in any well known manner such as in U.S. Pat. Nos. 3,427,366 or 3,663,480 incorporated herein by reference. Alternatively, these polymers are commercially available and are sold under tradenames such as PolyBD R-15M and R-45HT from the Atlantic Richfield Company, and HYSTL G-1000, G-2000, and G-3000 from the Hystl Development Company.

The carboxyl-terminated polybutadiene polymers and copolymers may be prepared as described in U.S. Pat. No. 3,235,589, and may have a molecular weight within the range of 500 to 10,000. Alternatively, a commercially available carboxyl-terminated butadiene liquid polymer, as for example, those designated HYSTL C-1000 and C-2000 from the Hystl Development Company, and those designated HC-434 from Thiokol Chemical Corporation, may be used.

The copolymers of butadiene may be with styrene, acrylic acid, vinyl acetate, acrylonitrile, isoprene, α-methyl styrene, N-vinyl carbazole, N-vinyl pyrollidene, methacrylic acid, acrylamide, methyl methacrylate, butyl methacrylate, vinyl chloride, or any other monomer. Examples of commercially available copolymers are designated Poly BD CS-15 and CN-15 from Atlantic Richfield Company. CS-15 is a 75/25 butadiene/sytrene polymer. CN-15 is a 85/15 butadiene/acrylonitrile polymer.

Representative polyester resins containing pendant vinyl groups will be those obtained from the reaction of dicarboxylic acid, with, trimethylol propane monoallyl ether or a mixture of the allyl ether with a glycol such as propylene glycol.

The number of pendant vinyl groups, present in the polyester resin, would depend on the amount of the allyl ether used in the esterification.

Polyether containing pendant vinyl groups are obtained from the polymerization of an oxirane such as allyl glycidyl ether in the presence of boron trifluoride as the catalyst.

Other epoxides such as ethylene oxide can be copolymerized with the allyl glycidyl ether as a way of controling the number of pendant vinyl groups present in the polyether.

A polysulfide backboned polymer with the pendant allyl groups useful herein may be prepared by incorporating 2,3-dichloropropylallylether in the reaction in place of, or in addition to, the normal trichloropropane. To have hydroxyl terminals, the product is capped with ethylene oxide. Furthermore, hydroxyl and carboxyl terminals may be formed as in U.S. Pat. No. 2,676,165.

The perfluoroalkyl iodides which are suitable for use in this invention correspond to the general formula: $C_nF_{2n+1}I$ wherein $n = 2$ to 30, preferably $n = 2$ to 20, and most preferably any single perfluoroalkyl iodide or any mixture thereof. These iodides may be prepared in any well known manner. Representative modes of preparation are illustrated in "Fluorocarbons and their Derivatives" by R. E. Banks, London, 1964, p. 56–61; and in an article by Hazeldine, J. Chem. Soc., London, 1953, p. 3761 which are incorporated herein by reference. These perfluoroalkyl iodides are completely fluorinated and contain no hydrogen or other substituents along the alkyl chain as evidenced by the alternative representation $R_fI$. While individual iodides may be used, some advantages develop from the use of mixed allkyl groups, thereby making such a mixture suitable for use in this invention.

The addition of the perfluoroalkyl iodides to the hydroxyl or carboxyl-terminated polymer, having pendant vinyl or allyl groups wherein perfluoroalkyl iodide is reacted with at least some of the pendant vinyl or allyl groups, may readily be performed by reacting perfluoroalkyl iodides with the desired polymer in the presence of a free-radical generating catalyst or ultraviolet light, at a temperature of about 40°–150°C., and either with or without solvent as disclosed in, and incorporated by reference herein, copending U.S. Ser. No. 259,650 filed June 5, 1972.

The reaction products of this invention may be dehydroiodinated for the most part by reaction with an amine such as morpholine or a strong base such as sodium hydroxide or potassium hydroxide in a suitable medium such as water or dioxane. The removal of the iodine produces a less corrosive product, which may be desirable, but is not necessary, to produce the molds of this invention. The dehydroiodinated version is meant to be encompassed within the meaning of the reactions of the perfluoroalkyl iodides and the hydroxyl or carboxyl-terminated polymers and copolymers.

The perfluoroalkyl iodide modified polymers with hydroxyl terminals are then reactable with polyisocyanates to prepare urethane prepolymers using conventional technology, or to be reacted with polyepoxides to form polyether again with conventional technology. Furthermore, the carboxyl terminated modified polymers may be reacted with the polyepoxides to form polyesters.

Examples of suitable organic polyisocyanates, which are reacted with the perfluoroalkyl iodide modified hydroxyl terminated polymers to form said urethane prepolymers, include aromatic diisocyanates such as 2,4-tolylene diisocyanate, 2,6-tolylene diisocyanate, p-phenylene diisocyanate, 4,4'-diphenylmethane diisocyanate, 3,3'-dimethyl-4,4'-diphenylmethane diisocyanate, 4,4'-diphenylene diisocyanate, 1,5-naphthylene diisocyanate; aliphatic diisocyanates such as trimethylene diisocyanate tetramethylene diisocyanate, adipyl diisocyanate, hexamethylene diisocyanate; aliphatic diisocyanates containing the aromatic ring such as p-xylene diisocyanate, m-xylylene diisocyanate; cyclo-aliphatic diisocyanates such as methylene-bis-4,4'-cyclohexylisocyanate, isopropylidene-bis-4,4'-cyclohexylisocyanate, cyclohexane 1,4-diisocyanate. Mixture of two or more of said polyisocyanates may also be used.

In addition to the simple polyisocyanates described above, the hydroxyl-terminated perfluoroalkyl iodide modified materials can be condensed with isocyanate polymers, such as polyarylene polyisocyanate (PAPI) and/or with isocyanate-terminated polyhydroxy materials, e.g., polyesters, etc., which are generally produced by reacting the isocyanate with, for example, polyglycols (such as polypropylene glycol) and polyesters (for instance of glycols, including polyglycols and polycarboxylic acids, such as polyethylene adipate). These materials may be reacted with an excess of a diisocyanate. An example of such a material is the product obtained by the reaction of one mole of propylene glycol with 2 moles of 2,4-tolylene diisocyanate as shown below:

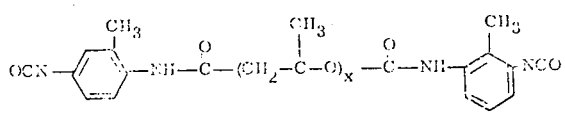

As mentioned, polyisocyanates such as the materials sold commercially as PAPI (polyarylene polyisocyanate) of the following structure:

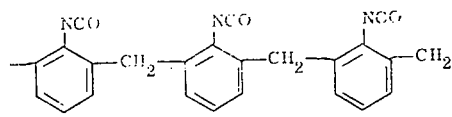

can also be employed. Other isocyanate reactants which can be utilized in the manufacture of the products of the present invention are isocyanate terminated prepolymers prepared by the reaction of tolylene diisocyanates or other isocyanates with hydroxyl or amine-terminated polyesters, polyethers, or polyamides so that the hydroxyl terminated perfluoroalkyl iodide modified polymers disclosed herein act as chain extending or curing agents for the other polymers. The isocyanate materials are often used in an amount sufficient to supply 0.1 to 10 NCO groups per OH group of the intermediate polymer, preferably about 0.5 to 5 isocyanate groups per hydroxyl. When simple diisocyanates are used, it is preferred to employ about 4–10 percent, say about 5–8 percent diisocyanate by weight of the intermediate polymer, or other hydroxyl-terminated polymer which enters the urethane reaction.

In view of the natural affinity of fluorocarbon compounds for oxygen from the air, skinning of the fluoromodified polymers is relatively rapid. Accordingly any normal antioxidant may be used, such as a phenolic antioxidant like Plastanox 2246, or 4,4'-methylene bis (2,6-di-tert-butylphenol) (Ethyl Corp. Antioxidant 702), or 4,4'-methylene bis (6-tert-butyl-o-cresol) (Ethyl Corp. Antioxidant 720).

The NCO-terminated perfluoroalkyl iodide modified polymer is then cured to form a mold or a mold liner, or it is used as a casting composition. In all cases, the curing is in accord with normal urethane technology, i.e. both polyols and polyamines may be used either individually or in mixtures.

These prepolymers may be reacted with polyhydroxy materials such as glycols, including polyglycols, polyesters and further amounts of hydroxyl-terminated polydiene, to give additional urethane linkages in the finished polymer. When reacted with diamines, urea-urethane polymers are formed. Urea-urethane polymers also may be formed in a single step by concurrent reactions among the perfluoroalkyl iodide modified polymer, the polyisocyanate and the diamine.

A wide variety of aromatic and aliphatic diamines may be employed as a reaction component to make the inherently mold releasable molds mold liners, or casting compositions of the present invention.

Typical amines of up to 40 or more carbon atoms which may be employed are aromatic diamines (both substituted and unsubstituted) such as 4,4'-methylene bis (2-chloroaniline) (MOCA), 3,3'-dichlorobenzidine (DCB), N,N'-disecondarybutyl p-phenylene diamine, N,N'-dibenzylethylene diamine, methane diamine, ethylene diamine, ethanolamines, hydroxylamine, p,p'-idphenylamine, p-phenylene diphenylamine, hexamethylene diamine, diethylene triamine, tetraethylene pentamine, lauroguanamine, and amine-terminated products obtained from the reaction of dibasic acids with diamines. Diamides of similar carbon atom range can also be employed as chain extending agents; e.g., materials made by the reaction of dibasic acids, acid chlorides or anhydrides with ammonia.

Typical polyols which may be employed are such as polypropylene diol, oxypropylated ethylene diamine, ethylene glycol, catechol, oxypropylated aniline, propylene glycol, diethylene glycol, triethylene glycol, the butane diols, pentane diol, hexane diol, neopentyl glycol, triallyloxy pentaerythritol, triallyloxy hexane tetrol, tetraallyloxy arabitol, and pentallyloxy dulcitol.

Alternatively, the perfluoroalkyl iodide modified hydroxyl terminated polymer can be used to cure other NCO-terminated prepolymers as indicated above, again by conventional urethane technology, to produce the molds, mold liners, or casting composition of this invention which require no mold release agent when used.

Polyepoxide materials react with the above-described hydroxyl or carboxyl terminated perfluoroalkyliodide-modified polymers to form polyethers or polyesters possessing the same mold release properties described. The polyepoxides are preferably liquids which have an average epoxide functionality of approximately two epoxide groups per molecule of polyepoxide material. The position of epoxide groups in the polyepoxide material is not critical to the practice of this invention. For instance, if the polyepoxide material is essentially linear in structure epoxide groups may be in terminal positions or they may be positioned intermediately and/or randomly along the linear structure. Polyepoxide materials which may enter into cure with the above defined polymers include the following types of materials:

1. Essentially linear types such as

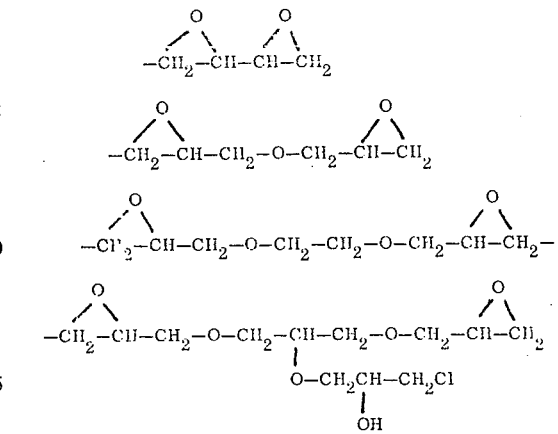

and epoxidized polybutadiene materials such as those which have an epoxide functionality of four or more and which are sold under the designation "Oxiron" resins, i.e., "Oxiron 2000," "Oxiron 2001" and "Oxiron 2002";

2. Epichlorohydrin-bisphenol A types which are aromatic in nature and which include those sold under the trademark designation "Tipox," i.e., "Tipox A," "Tipox B," and "Tipox C," those sold under the designation "Epon" resins, i.e., "Epon 828" and "Epon 820," those sold under the designation "Bakelite ERL" resins, and those sold under the designation "Epi-Rez" resins, i.e., Epi-Rez 510;

3. Cyclo-aliphatic types which include those sold under the designation "Unox" resins, i.e., "Unox 206," which is epoxy ethyl-3,4-epoxy cyclohexane and "Unox 201," which is 3,4-epoxy-6-methylcyclohexylmethyl-3,4-epoxy-6-methylcyclohexanecarboxylate;

4. Resorcinol diglycidyl ether types which include those sold under the designation "Kopoxite" resins, i.e., "Kopoxite 159";

5. Epoxy novalak type which includes the resins sold under the designations "Dow Epoxy Novalak 438" and "DEN438-EK85," and also those sold under the designation "KER" resins, i.e., "KER 357A" and "KER 955A";

6. Epoxidized fatty acid resins including the Epoxol materials such as "Epoxol 9-5"; and others. In certain instances some solid polyepoxide materials may be used, say where a finely distributed uniform dispersion with liquid polymers may be obtained, or where the solid polyepoxides are soluble in the polymer. Useful polyepoxide materials according to the practice of this invention have epoxide equivalent weights of 100 to over 4000. Thus within the requirements here taught a practitioner in the art may choose from among a wide variety of polyepoxide materials as to specific epoxide equivalent values, specific molecular configuration, molecular weight and functionality to pursue practice of this invention.

The fluorine content of any of the polymers is not critical but is controlled more for economic then technical reasons. Thus, the polymer may have a fluorine content of 1–40 percent preferably 3–25 percent, and most preferably 6–15 percent. Of course, the higher tthe fluorine content, the more long lasting are the mold release properties.

The following examples are given to illustrate the practice of the present invention and are not intended to limit the scope thereof.

EXAMPLE I

This example shows the detailed preparation of a mold representative of this invention, and its subsequent testing.

A mixture of 250 g. of Poly BD R-45M resin (a hydroxyl-terminated polybutadiene polymer from ARCO Chemical), 61.24 g. of perfluorodecyl iodide ($C_{10}F_{21}I$), 5g. benzoyl peroxide, and 200 mls. dioxane were placed in a reaction flask containing a stirrer and condenser. The reaction mixture was cloudy pink but turned clear amber during gradual heating 90°C. The reaction was kept at a slow reflux for 10 hours and the progress thereof followed by vapor phase chromatographic analysis. When no unreacted $C_{10}F_{21}I$ was present, as shown by the chromatographic analysis, the solvent was removed by means of a vacuum evaporator with a water bath at 40°C. for 7 hours. The result was 237.1 g of perfluorodecyl iodide modified hydroxyl-terminated polybutadiene polymer which had 11.00% fluorine.

Conversion of the fluorinated, hydroxyl-terminated polymer to a urethane prepolymer was achieved by further reaction of the resin with a diisocyanate (TDI). 33 g. of Hylene TM (a mixture of 2,4 and 2,6 tolylene diisocyanate) was added to the fluorinated resin of above and the reactants were heated for 5 hours at 75°–80°C. to complete the prepolymer reaction. The prepolymer then had a 3.40% NCO and 10.26% fluorine content.

The above fluorinated urethane prepolymer was made into a mold wherein its mold release properties were tested. The mold was formulated from 100 g. of the prepolymer from above, .25 g. Antifoam A, 2.87 g. Quadrol (N,N,N',N'-tetrakis (2-hydroxypropylethylene diamine), and 2.87 g. 2-ethyl-1,3-hexanediol. The Antifoam A was used as a degassing agent to produce bubble free molds. After all of the ingredients were mixed together the composition was degassed in a heated desiccator under vacuum at 120°F. for 5 minutes. The composition was then poured into a mold with a pattern of the article to be later cast. The mold was then allowed to cure for 16 hours at room temperature, whereupon the pattern was removed.

To test the mold release properties of the mold, a water filled polyester resin was cast into the mold, cured at room temperature, and removed. 100 g. Polylite polyester resin from Reichhold Chemical was extended with 100 g. tap water with the water being added gradually with stirring until a uniform mixture was obtained. Just prior to each casting 3 parts/100 parts of water extended resin of methyl ethyl ketone peroxide in butyl phthalate solution was added as curing agent. 50 separate castings were made from the mold prepared as above and all of the castings were removed from the mold with no trouble whatsoever. Also, all of the castings were extremely clear in detail.

EXAMPLE II

The procedure of Example I was repeated except that a hydroxyl-terminated butadiene/styrene copolymer (Poly BD CS-15 from ARCO) was substituted for the butadiene homopolymer.

Into the resultant mold was cast an extended urethane, Vultafoam RUR-251-10 from General Latex and Chemical Corp. More than 25 excellent castings were obtained without the use of any mold release agent.

EXAMPLE III

The procedure of Example II was repeated except varying the curative used in preparing the mold. The following curatives were used in the amounts specified per 100 g. of fluorinated prepolymer:

| | |
|---|---|
| a. Isonol 100 | 6.4 g. |
| Quadrol | 1.12 g. |
| b. Triisopropanol Amine | 5.36 g. |
| c. Isonol 100 | 7.04 g. |
| Quadrol | 1.23 g. |
| d. Trimethylolpropane | 3.76 g. |
| e. Isonol 100 | 5.81 |
| Quadrol | 1.02 |

In all of the curing formulations, the molds cured within 24 hours, and they all showed their mold release properties when the Vultafoam RUR-251-10 was cast into them. Isonol 100 is N,N-bis (2-hydroxypropyl) aniline from Upjohn.

EXAMPLE IV

This example shows the use of the fluorinated polyurethane as a mold liner for a polyurethane mold.

To prepare the mold, a composition like that of Example I, but with a fluorine content of only 4.2 percent was degassed and poured into mold with the pattern sought to be cast. This mold was allowed to stand at room temperature for 2 hours at which time the mixture had gelled and was in a tacky state. Next a strip of teflon was placed at one end, over the tacky material, to prevent adhesion between the fluorinated urethane prepolymer and the unfluorinated urethane at this point. The separation was for testing the adhesion between the two materials, and would not normally be there.

Next a mixture of Solithane -291, a polyester-based urethane prepolymer of Thiokol Chemical Corporation, and Isonol 93 curative from Upjohn was prepared, degassed, and then poured into the mold over the fluorinated composition. The mold was then allowed to cure for 24 hours at room temperature.

To determine the mold release properties of the mold which was lined with the fluorinated material, an epoxy resin ERL-2795 from Union Carbide was prepared and cast into the mold. More than 10 castings were obtained with no apparent deterioration in the mold release properties. All of the castings were clear in detail and easily released from the mold.

To test the adhesion between the fluorinated and non-fluorinated polyurethanes, the teflon strip was removed and the two materials were pulled apart. It was found that exceptional adhesion had formed, thereby showing the use of the composition as a mold liner. Also, during the removal of the above castings by flexing the mold, no separation occurred between the fluorinated and non-fluorinated polyurethanes.

EXAMPLE V

A mold requiring no mold release agent is prepared from a polysulfide-backboned-polymer by incorporating in the preparation thereof 2,3-dichloropropylallylether in place of the trichloropropane and capping the mercaptan terminated polymer with ethylene oxide to give hydroxyl terminals. Thus a polysulfide polymer with hydroxyl terminals and pendant allyl groups is prepared. The procedure of Example I in adding the perfluoroalkyl iodide, making the urethane prepolymer and making a mold therefrom is repeated. The prepolymer is made to have 16.2% fluorine.

To test the mold release properties of the resultant mold. A polyester casting resin, MR -37C produced by W. R. Grace & Co., is prepared and cast into the mold as described previously. Fifteen castings with excellent reproduction of detail are obtained with no apparent deterioration of the mold.

EXAMPLE VI

A polyether mold requiring no mold release agent is prepared by reacting the hydroxyl-terminated fluorocarbon-containing polybutadiene polymer of Example I with a polyepoxy resin. The mold is formulated from 100 g. of the polymer of Example I, 50 g. of ERL-2774 (a bisphenol-A type epoxy resin from Union Carbide) 5 g. 2,4,6-tri (dimethyl-amino methyl) phenol as a catalyst, and 0.5 g. Antifoam A. A mold is prepared from this formulation as described in Example I and the mold release properties are tested with the Polylite water extended polyester resin. Over 35 separate castings are made and all of the castings have a detailed and precise reproduction of the surface pattern of the article being copied.

EXAMPLE VII

This example shows the preparation of a polyester mold from a carboxyl-terminated polymer and a polyepoxide.

The procedure of Example I is repeated except that HC-434 (a carboxyl-terminated polybutadiene resin from Thiokol Chemical Corporation) replaces the Poly BD R-45M and a polyepoxide is used instead of the Hylene TM. The mole is then prepared from 100 g. of the 18.3% flourocarbon-containing carboxyl terminated polymer, 20 g. of ERL-4239 from Union Carbide [bis (3,4-epoxy-6-methyl cyclohexyl methyl) adipate], 3 g. of stannous octoate catalyst, and 0.5 g. Antifoam A degassing agent.

The resultant mold is tested using the Polylite water extended polyester resin of Example I and more than 35 castings are obtained all with excellent reproduction of the surface characteristics of the article being copied.

What is claimed is:

1. A mold, which requires no mold release agent, in which at least the surface that contacts a casting composition comprises a cured fluorocarbon-containing polyester prepared from polyepoxides having epoxide functionality of approximately two epoxide groups per molecule and a carboxy terminated polymer; wherein said carboxy-terminated polymers contain pendant vinyl or allyl groups and wherein at least some of said pendant groups are converted to 2-perfluoroalkyl-1 - iodoethyl groups or 3 - perfluoroalkyl-2-iodopropyl groups to provide a fluorine content of from 1 to 40 percent.

2. The mold of claim 1 wherein the carboxy-terminated polymers having pendant vinyl or allyl groups are selected from the group consisting of polybutadiene polymers, polybutadiene copolymers, polyether polymers, polyester polymers, and polysulfide polymers.

3. The mold of claim 2 wherein the carboxy-terminated polymers having pendant vinyl or allyl groups are polybutadiene polymers.

4. The mold of claim 2 wherein the carboxy-terminated polymers having pendant vinyl or allyl groups are butadiene/styrene copolymers.

5. The mold of claim 1 wherein the cured fluorocarbon-containing polyester polymer comprises the entire mold.

6. The mold of claim 1 wherein the cured fluorocarbon-containing polymer prior to curing contains 3–25 percent by weight fluorine.

7. The mold of claim 1 wherein the cured fluorocarbon-containing polymer prior to curing contains 6–15 percent by weight fluorine.

8. A fluorocarbon-containing polymer casting composition, which is inherently mold releasable, which comprises a polyester prepared from polyepoxides having epoxide functionality of approximately two epoxide groups per molecule and an carboxy terminated polymer, wherein said carboxy-terminated polymers contain pendant vinyl or allyl groups and wherein at least some of said pendant groups are converted to 2-perfluoroalkyl-1 iodoethyl groups or 3-perfluoroalkyl-2-iodopropyl groups to provide a fluorine content of from 1 to 40 percent.

9. The casting composition of claim 8 wherein the carboxy-terminated polymers having pendant vinyl or allyl groups are selected from the group consisting of polybutadiene polymers, polybutadiene copolymers, polyether polymers, polyester polymers, and polysulfide polymers.

10. The casting composition of claim 9 wherein the carboxy-terminated polymers having pendant vinyl or allyl groups are polybutadiene polymers.

11. The casting composition of claim 9 wherein the carboxy-terminated polymers having pendant vinyl or allyl groups are butadiene/sytrene copolymers.

* * * * *